United States Patent
Holtzman et al.

(10) Patent No.: US 8,423,788 B2
(45) Date of Patent: Apr. 16, 2013

(54) SECURE MEMORY CARD WITH LIFE CYCLE PHASES

(75) Inventors: Micky Holtzman, Kfar-Vradim (IL); Baruch Boris Cohen, Carmiel (IL); Ron Barzilai, Kfar-Vradim (IL)

(73) Assignee: SanDisk Technologies Inc., Plano, TX (US)

( * ) Notice: Subject to any disclaimer, the term of this patent is extended or adjusted under 35 U.S.C. 154(b) by 1002 days.

(21) Appl. No.: 11/053,273

(22) Filed: Feb. 7, 2005

(65) Prior Publication Data

US 2006/0177064 A1    Aug. 10, 2006

(51) Int. Cl.
*G06F 11/30* (2006.01)
*H04L 9/00* (2006.01)
*G06F 13/00* (2006.01)

(52) U.S. Cl.
USPC ............ 713/189; 380/277; 711/163; 711/164

(58) Field of Classification Search .................. 713/189; 380/277; 711/164, 163
See application file for complete search history.

(56) References Cited

U.S. PATENT DOCUMENTS

| | | | |
|---|---|---|---|
| 4,549,896 A | 10/1985 | Streicher et al. ................ 65/135 |
| 4,590,552 A | 5/1986 | Guttag et al. .................. 364/200 |
| 4,697,072 A * | 9/1987 | Kawana ......................... 235/380 |
| 4,713,753 A | 12/1987 | Boebert et al. ................ 364/200 |
| 4,780,905 A | 10/1988 | Cruts et al. ....................... 380/44 |
| 4,797,853 A | 1/1989 | Savage et al. ................. 364/900 |
| 4,907,268 A | 3/1990 | Bosen et al. ....................... 380/4 |
| 5,006,823 A | 4/1991 | Baril et al. .................... 333/164 |
| 5,065,429 A | 11/1991 | Lang ............................... 380/25 |
| 5,235,641 A | 8/1993 | Nozawa et al. | |
| 5,268,870 A | 12/1993 | Harari ........................... 365/218 |
| 5,293,424 A * | 3/1994 | Holtey et al. ................. 713/193 |
| 5,311,595 A | 5/1994 | Bjerrum et al. ................ 380/25 |
| 5,319,765 A | 6/1994 | Kimura ......................... 395/425 |
| 5,327,563 A | 7/1994 | Singh ............................ 395/700 |
| 5,404,485 A | 4/1995 | Ban ............................... 395/425 |
| 5,438,575 A | 8/1995 | Bertrand ........................ 371/48 |

(Continued)

FOREIGN PATENT DOCUMENTS

| EP | 0 087 143 A1 | 8/1983 |
|---|---|---|
| EP | 0 461 983 A1 | 12/1991 |

(Continued)

OTHER PUBLICATIONS

ISA/EPO, "Invitation to Pay Additional Fees," mailed on Mar. 8, 2007 in corresponding Int'l. App. No. PCT/US2006/003876, 7 pages.

(Continued)

*Primary Examiner* — Kambiz Zand
*Assistant Examiner* — Teshome Hailu
(74) *Attorney, Agent, or Firm* — Brinks Hofer Gilson & Lione (57) ABSTRACT

A secure memory card with encryption capabilities comprises various life cycle states that allow for testing of the hardware and software of the card in certain of the states. The testing mechanisms are disabled in certain other of the states thus closing potential back doors to secure data and cryptographic keys. Controlled availability and generation of the keys required for encryption and decryption of data is such that even if back doors are accessed that previously encrypted data is impossible to decrypt and thus worthless even if a back door is found and maliciously pried open.

7 Claims, 4 Drawing Sheets

U.S. PATENT DOCUMENTS

| | | | |
|---|---|---|---|
| 5,442,704 A | 8/1995 | Holtey et al. | 380/23 |
| 5,455,862 A | 10/1995 | Hoskinson | 380/21 |
| 5,477,039 A | 12/1995 | Lisimaque et al. | 235/380 |
| 5,509,120 A * | 4/1996 | Merkin et al. | 726/24 |
| 5,606,660 A | 2/1997 | Estakhri et al. | 395/183.14 |
| 5,629,513 A | 5/1997 | Geronimi et al. | 235/492 |
| 5,710,639 A | 1/1998 | Kuznicki et al. | 358/426 |
| 5,742,616 A * | 4/1998 | Torreiter et al. | 714/732 |
| 5,825,882 A | 10/1998 | Kowalski et al. | 380/25 |
| 5,857,020 A | 1/1999 | Peterson, Jr. | 380/4 |
| 5,860,082 A | 1/1999 | Smith et al. | 711/103 |
| 5,886,926 A | 3/1999 | Marquot | |
| RE36,181 E | 4/1999 | Koopman, Jr. et al. | 380/23 |
| 5,896,398 A | 4/1999 | Sekine | |
| 5,917,909 A | 6/1999 | Lamla | 705/67 |
| 5,933,854 A | 8/1999 | Yoshimura | 711/164 |
| 5,943,423 A | 8/1999 | Muftic | 380/25 |
| 5,956,405 A | 9/1999 | Yuval | 380/29 |
| 5,987,134 A | 11/1999 | Shin et al. | 380/25 |
| 5,995,965 A | 11/1999 | Experton | 707/10 |
| 6,026,402 A | 2/2000 | Vossen et al. | 707/9 |
| 6,028,933 A | 2/2000 | Heer et al. | 380/9 |
| 6,073,234 A | 6/2000 | Kigo et al. | 713/161 |
| 6,101,588 A | 8/2000 | Farley et al. | 711/168 |
| 6,148,354 A | 11/2000 | Ban et al. | 710/102 |
| 6,154,544 A | 11/2000 | Farris et al. | 380/262 |
| 6,158,004 A | 12/2000 | Mason et al. | 713/200 |
| 6,181,252 B1 | 1/2001 | Nakano | 340/825.31 |
| 6,182,229 B1 | 1/2001 | Nielsen | 713/202 |
| 6,230,223 B1 | 5/2001 | Olarig | 710/126 |
| 6,230,233 B1 | 5/2001 | Lofgren et al. | 711/103 |
| 6,236,280 B1 * | 5/2001 | Allee | 331/111 |
| 6,243,816 B1 | 6/2001 | Fang et al. | 713/202 |
| 6,253,328 B1 | 6/2001 | Smith, Jr. | 713/202 |
| 6,353,888 B1 | 3/2002 | Kakehi et al. | 713/185 |
| 6,356,941 B1 | 3/2002 | Cohen | 709/219 |
| 6,370,251 B1 | 4/2002 | Hardy et al. | 380/286 |
| 6,371,377 B2 | 4/2002 | Asoh et al. | 235/487 |
| 6,385,729 B1 | 5/2002 | DiGiorgio et al. | 713/201 |
| 6,389,542 B1 | 5/2002 | Flyntz | 713/201 |
| 6,393,565 B1 | 5/2002 | Lockhart et al. | 713/172 |
| 6,422,460 B1 | 7/2002 | Boesch | 235/380 |
| 6,434,700 B1 | 8/2002 | Alonso et al. | 713/169 |
| 6,445,794 B1 | 9/2002 | Shefi | 380/46 |
| 6,457,126 B1 | 9/2002 | Nakamura | |
| 6,490,680 B1 | 12/2002 | Scheidt et al. | |
| 6,510,501 B1 * | 1/2003 | Ho | 711/163 |
| 6,515,904 B2 | 2/2003 | Moore et al. | |
| 6,522,655 B1 | 2/2003 | Laiho | 370/410 |
| 6,577,734 B1 | 6/2003 | Etzel et al. | 380/277 |
| 6,615,347 B1 | 9/2003 | de Silva et al. | 713/156 |
| 6,615,352 B2 | 9/2003 | Terao et al. | 713/184 |
| 6,629,192 B1 | 9/2003 | Schaefer et al. | 711/103 |
| 6,671,808 B1 | 12/2003 | Abbott et al. | 713/200 |
| 6,678,828 B1 | 1/2004 | Zhang et al. | 713/201 |
| 6,742,117 B1 | 5/2004 | Hikita et al. | 713/172 |
| 6,754,765 B1 | 6/2004 | Chang et al. | 711/103 |
| 6,763,399 B2 | 7/2004 | Margalit et al. | 710/13 |
| 6,783,078 B1 * | 8/2004 | Leaming | 235/492 |
| 6,804,786 B1 | 10/2004 | Chamley et al. | 713/201 |
| 6,810,123 B2 | 10/2004 | Farris et al. | 380/262 |
| 6,829,676 B2 | 12/2004 | Maeda et al. | 711/103 |
| 6,832,731 B2 | 12/2004 | Kaneko | 235/492 |
| 6,845,908 B2 | 1/2005 | Morita et al. | 235/382 |
| 6,848,045 B2 | 1/2005 | Long et al. | 713/4 |
| 6,865,555 B2 | 3/2005 | Novak | 705/59 |
| 6,880,079 B2 | 4/2005 | Kefford et al. | 713/155 |
| 6,912,633 B2 * | 6/2005 | de Jong | 711/163 |
| 6,928,547 B2 | 8/2005 | Brown et al. | 713/186 |
| 7,023,996 B2 * | 4/2006 | Stephenson et al. | 380/270 |
| 7,036,020 B2 | 4/2006 | Thibadeau | |
| 7,058,818 B2 | 6/2006 | Dariel | 713/189 |
| 7,062,616 B2 | 6/2006 | Sadhasivan et al. | 711/153 |
| 7,120,729 B2 | 10/2006 | Gonzalez et al. | 711/103 |
| 7,127,550 B1 | 10/2006 | Lin | |
| 7,215,771 B1 | 5/2007 | Hamlin | |
| 7,364,087 B2 | 4/2008 | Zimmer et al. | |
| 7,370,192 B2 * | 5/2008 | Sumner | 713/100 |
| 7,412,053 B1 * | 8/2008 | Lyle | 380/2 |
| 7,426,747 B2 | 9/2008 | Thibadeau | |
| 7,493,656 B2 | 2/2009 | Goodwill et al. | |
| 2001/0019614 A1 | 9/2001 | Madoukh | 380/277 |
| 2001/0025355 A1 | 9/2001 | Palm et al. | 714/726 |
| 2001/0047335 A1 * | 11/2001 | Arndt et al. | 705/44 |
| 2002/0029343 A1 | 3/2002 | Kurita | 713/185 |
| 2002/0034303 A1 | 3/2002 | Farris et al. | 380/270 |
| 2002/0065730 A1 | 5/2002 | Nii | 705/26 |
| 2002/0099666 A1 | 7/2002 | Dryer et al. | 705/71 |
| 2002/0141588 A1 | 10/2002 | Rollins | |
| 2002/0145632 A1 | 10/2002 | Shmueli et al. | 345/835 |
| 2002/0174337 A1 | 11/2002 | Aihara | 713/172 |
| 2002/0176575 A1 | 11/2002 | Qawami et al. | 380/201 |
| 2002/0178370 A1 | 11/2002 | Gurevich et al. | 713/189 |
| 2002/0186842 A1 | 12/2002 | Sabet-Sharghi et al. | 380/200 |
| 2002/0191794 A1 | 12/2002 | Farris et al. | 380/260 |
| 2003/0018889 A1 | 1/2003 | Burnett et al. | 713/153 |
| 2003/0028514 A1 | 2/2003 | Lord et al. | 707/1 |
| 2003/0028797 A1 | 2/2003 | Long et al. | 713/194 |
| 2003/0061504 A1 | 3/2003 | Sprigg et al. | 713/200 |
| 2003/0070083 A1 | 4/2003 | Nessler | 713/193 |
| 2003/0110169 A1 | 6/2003 | Zuili et al. | 707/9 |
| 2003/0120938 A1 | 6/2003 | Mullor | 713/190 |
| 2003/0131210 A1 | 7/2003 | Mueller | 711/200 |
| 2003/0135739 A1 | 7/2003 | Talton, Sr. | 713/185 |
| 2003/0149886 A1 | 8/2003 | Ito et al. | 713/193 |
| 2003/0156473 A1 | 8/2003 | Sinclair et al. | 365/200 |
| 2003/0177319 A1 * | 9/2003 | de Jong | 711/154 |
| 2003/0204726 A1 | 10/2003 | Kefford et al. | 713/171 |
| 2003/0212894 A1 | 11/2003 | Buck et al. | 713/184 |
| 2003/0221117 A1 * | 11/2003 | Teglia | 713/189 |
| 2004/0044625 A1 | 3/2004 | Sakamura et al. | 705/41 |
| 2004/0066936 A1 | 4/2004 | Farris et al. | 380/270 |
| 2004/0083335 A1 | 4/2004 | Gonzalez et al. | 711/103 |
| 2004/0083370 A1 | 4/2004 | de Jong | 713/182 |
| 2004/0098585 A1 | 5/2004 | Grove et al. | 713/168 |
| 2004/0103288 A1 | 5/2004 | Ziv et al. | |
| 2004/0117653 A1 | 6/2004 | Shapira et al. | 713/201 |
| 2004/0123127 A1 | 6/2004 | Teicher et al. | 713/193 |
| 2004/0128523 A1 | 7/2004 | Fujioka | 713/189 |
| 2004/0132437 A1 | 7/2004 | Ohmori et al. | 455/414.1 |
| 2004/0139021 A1 | 7/2004 | Reed et al. | 705/50 |
| 2004/0153642 A1 | 8/2004 | Plotkin et al. | 713/150 |
| 2004/0168081 A1 | 8/2004 | Ladas et al. | 713/201 |
| 2004/0186994 A1 | 9/2004 | Herbert et al. | 713/164 |
| 2004/0193925 A1 | 9/2004 | Safriel | 713/202 |
| 2005/0010758 A1 | 1/2005 | Landrock et al. | 713/156 |
| 2005/0010783 A1 | 1/2005 | Libin et al. | 713/182 |
| 2005/0015588 A1 | 1/2005 | Lin et al. | 713/159 |
| 2005/0033968 A1 | 2/2005 | Dupouy et al. | 713/183 |
| 2005/0049931 A1 | 3/2005 | Wisnudel et al. | 705/26 |
| 2005/0050330 A1 | 3/2005 | Agam et al. | 713/172 |
| 2005/0091494 A1 * | 4/2005 | Hyser | 713/171 |
| 2005/0109841 A1 | 5/2005 | Ryan et al. | |
| 2005/0114620 A1 | 5/2005 | Justen | 711/170 |
| 2005/0120205 A1 | 6/2005 | Umezawa et al. | 713/156 |
| 2005/0123132 A1 | 6/2005 | Sumner | 380/44 |
| 2005/0160217 A1 | 7/2005 | Gonzalez et al. | 711/6 |
| 2005/0188167 A1 * | 8/2005 | Squibbs et al. | 711/163 |
| 2005/0210231 A1 * | 9/2005 | Bouchier et al. | 713/1 |
| 2005/0228980 A1 * | 10/2005 | Brokish et al. | 713/2 |
| 2006/0129844 A1 * | 6/2006 | Oshikiri | 713/190 |
| 2006/0176068 A1 | 8/2006 | Holtzman et al. | 324/765 |
| 2006/0177064 A1 | 8/2006 | Holtzman et al. | 380/277 |
| 2006/0236111 A1 * | 10/2006 | Bodensjo et al. | 713/176 |
| 2006/0236318 A1 | 10/2006 | Moran et al. | |
| 2006/0239449 A1 | 10/2006 | Holtzman et al. | |
| 2006/0242151 A1 | 10/2006 | Jogand-Coulomb et al. | 707/9 |
| 2007/0011724 A1 | 1/2007 | Gonzalez et al. | 726/4 |
| 2007/0061570 A1 | 3/2007 | Holtzman et al. | 713/168 |
| 2007/0061581 A1 | 3/2007 | Holtzman et al. | 713/176 |
| 2007/0061597 A1 | 3/2007 | Holtzman et al. | 713/193 |
| 2007/0061897 A1 | 3/2007 | Holtzman et al. | 726/34 |
| 2007/0188183 A1 | 8/2007 | Holtzman et al. | |

FOREIGN PATENT DOCUMENTS

| | | |
|---|---|---|
| EP | 0 461 983 B1 | 4/1995 |
| EP | 0 919 904 A2 | 8/1998 |

| | | |
|---|---|---|
| EP | 1 004 992 A3 | 5/2000 |
| EP | 1 074 906 A1 | 8/2000 |
| EP | 1 209 657 A1 | 8/2000 |
| EP | 1 273 996 A2 | 1/2003 |
| EP | 1 351 151 A2 | 10/2003 |
| EP | 1 467 312 A1 | 4/2004 |
| EP | 1 429 224 A1 | 6/2004 |
| EP | 1 487 170 A2 | 6/2004 |
| EP | 1 457 922 A3 | 9/2004 |
| EP | 1 496 419 A1 | 1/2005 |
| GB | 2 391 082 A | 7/2002 |
| JP | 09-198316 | 7/1997 |
| JP | 11-161549 | 6/1999 |
| JP | 2000-172821 | 6/2000 |
| JP | 2002288453 | 10/2002 |
| JP | 2003-337749 | 11/2003 |
| WO | WO 99/047989 | 9/1999 |
| WO | WO 99/64996 | 12/1999 |
| WO | WO 00/48063 | 8/2000 |
| WO | WO 02/25415 | 3/2002 |
| WO | WO 02/48846 A2 | 6/2002 |
| WO | WO 02/103495 A1 | 12/2002 |
| WO | WO 03/081544 A3 | 10/2003 |
| WO | WO 03/096287 A1 | 11/2003 |
| WO | WO 2004/040578 A2 | 5/2004 |
| WO | WO 2004/040586 A1 | 5/2004 |
| WO | WO 2004/086228 A1 | 10/2004 |
| WO | WO 2004/092886 A2 | 10/2004 |
| WO | WO 2004/112036 A1 | 12/2004 |
| WO | WO 2005/001653 A2 | 1/2005 |
| WO | 2005/010808 | 2/2005 |
| WO | WO 2005/010686 A2 | 2/2005 |
| WO | WO 2005/010688 A2 | 2/2005 |
| WO | WO 2005/013125 A1 | 2/2005 |
| WO | 2006/069273 A2 | 6/2006 |

OTHER PUBLICATIONS

ISA/EPO, "Notification of Transmittal of the International Search Report and the Written Opinion of the International Searching Authority, or the Declaration," mailed on Aug. 17, 2007 in corresponding Int'l. App. No. PCT/US2006/003876, 19 pages.
Dialog Search, Oct. 6, 2004 (15 pages).
Discretix Technologies Ltd. "Secure Flash™ System Specification", Version 1.05, Jul. 15, 2004, Netanya, Israel (36 pages).
SanDisk Corporation I, "CryptoFlash Integration in BE2", Revision 1.21, Oct. 19, 2004, (34 pages).
SanDisk Corporation "BE2 Architecture", Revision 1.1, Jun. 9, 2003 (21 pages).
SanDisk Israel Discloser #SDK0570 "Flash Memory Card with in Stream data Encryption/Decryption", (4 pages).
Gonzalez and Tomlin, U.S. Appl. No. 10/751,033 "Flash Memory System Startup Operation", filed Dec. 31, 2003 (37 pages).
Non-Final Office Action dated Nov. 19, 2008 issued in U.S. Appl. No. 11/317,862, 18 pages.
Office Action issued in U.S. Appl. No. 11/317,390 dated Apr. 30, 2009 (14 pages).
Office Action issued in U.S. Appl. No. 11/317,862 dated Jul. 6, 2009 (9 pages).
Office Action issued in U.S. Appl. No. 11/317,862 on Feb. 4, 2010 (9 pages).
Dialog Search, Nov. 15, 2004 (31 pages).
Office Action issued in U.S. Appl. No. 11/317,390 on Mar. 17, 2010 (15 pages).
Office Action issued in U.S. Appl. No. 11/317,390 on Aug. 16, 2010 (14 pages).
Office Action issued in U.S. Appl. No. 11/317,862 on Aug. 30, 2010 (9 pages).
Response to Non-Final Office Action submitted in U.S. Appl. No. 11/317,390 on Feb. 16, 2011 (8 pages).
Notice of Allowance issued in U.S. Appl. No. 11/317,390, mailed May 3, 2011 (9 pages).
Amendment Filed Concurrently With Request for Continued Examination Under 37 C.F.R. § 1.114 submitted U.S. Appl. No. 11/317,862 on Feb. 28, 2011 (11 pages).
Office Action issued in U.S. Appl. No. 11/317,862, mailed Mar. 16, 2011 (9 pages).
Office Action issued in U.S. Appl. No. 11/317,862, dated Oct. 4, 2011 (9 pages).
U.S. Appl. No. 60/717,163, "Secure Yet Flexible System Architecture for Secure Devices with Flash Mass Storage Memory," filed Sep. 14, 2005, Micky Holtzman.
U.S. Appl. No. 60/717,164, "Secure Yet Flexible System Architecture for Secure Devices with Flash Mass Storage Memory," filed Sep. 14, 2005, Holtzman, et al.
U.S. Appl. No. 60/717,347, "Hardware Driver Integrity Check of Memory Card Controller Firmware," filed Sep. 14, 2005, Holtzman, et al.
Akagi, A., "SD Format Verification," Matsushita Technical Journal Apr. 2002 vol. 49, No. 2 pp. 11-14 ISSN: 1343-9529.
Allard, J.J., "Dynamic Memory Array Card Burn in and High Speed Functional Card Testing," 1981 International Test Conference, Testing in the 1980's pp. 244-248.
Barsness, A.R. et al.,"ECC Memory Card with Built in Diagnostic Aids and Multiple Usage," IBM Technical Disclosure Bulletin, Apr. 1982 vol. 24, No. 11B pp. 6173-6174.
Black, John, "Comments to NIST concerning AES Modes of Operations: A Suggestion for Handling Arbitrary-Length Messages with the CBC MAC," University of Nevada, Reno, Phillip Rogaway, University of California at Davis http://csrc.nist.gov/CryptoToolkit/modes/proposedmodes/xcbc-mac/xcbcmac-spec.pdf, 3 pages.
Communication Relating to the Results of the Partial International Search for International Application No. PCT/US2006/026241 mailed Dec. 18, 2006, 3 pages.
Deepakumara, Janaka, et al., "Performance Comparison of Message Authentication Code (MAC) Algorithms for the Internet Protocol Security (IPSEC) Electrical and Computer Engineering," Memorial University of Newfoundland, St. John's, NL, Canada, A1B3S7 http://www.engr.mun.ca/~howard/PAPERS/necec_2003b.pdf, 7 pages.
Dialog Search, Oct. 3, 2005 (31 pages).
Engelbrecht, R., et al., ByMedCard—An Electronic Patient Record with Chip Card Functionality, Health Cards '97 Fourth International Congress pp. 313-317.
Frankel, Sheila, "RFC 3566—The AES-XCBC-MAC-96 Algorithm and Its Use With IPsec," NIST-National Institute of Standards and Technology, 820 West Diamond Ave., Room 677, Gaithersburg, MD 20899, http://www.faqs.org/rfcs/rfc3566.html, 10 pages.
Gemplus, Employee Smart Badge, One Integrated and Secure Smart Badge to Manage All Access, 2 pages.
Guibert, H.; Gamache, A., Optical Memory Card Applicability for Implementing a Portable Medical Record, Medical Informatics Jul.-Sep. 1993 vol. 18, No. 3 pp. 271-278 ISSN: 0307-7640.
Haller, et al., "A One-Time Password System," IETF Standard-Working-Draft, Internet Engineering Task Force, IETF, No. 1, Mar. 24, 1997, XP015024796, pp. 1-8.
Hoornaert, "Vasco Data Security Enables Secure Communications Over the Internet," IS Audit & Control Journal, vol. IV, 1999, 3 pages.
Identification Cards—Contactless Integrated Circuit(s) Cards—Proximity Cards—Part 1: Physical Characteristics, ISO JEC_14443-1_2000_PDF, 10 pages.
Identification Cards—Contactless Integrated Circuit(s) Cards—Proximity Cards—Part 2: Radio Frequency Power and Signal Interface, ISO JEC_14443-2_2001_PDF, 18 pages.
iKey 1000, Workstation Security and Secure Remote Access, SafeNet, 2004, 2 pages.
iKey 2032, Personal USB Authentication and Encryption Token, SafeNet, 2005, 2 pages.
ISA/EPO, "Invitation to Pay Additional Fees", mailed on Jan. 26, 2007 in corresponding Intl. App. No. PCT/US2006/035839, 2 pages.
ISA/EPO, "Invitation to Pay Additional Fees", mailed on Dec. 18, 2006 in corresponding Int'l. App. No. PCT/US2006/026241, 7 pages.
ISA/EPO, "Notification of Transmittal of the International Search Report and the Written Opinion of the International Searching Authority, or the Declaration," mailed on Feb. 8, 2007 in corresponding Int'l. App. No. PCT/US2006/026241, 9 pages.
ISA/EPO, "Notification of Transmittal of the International Search Report and the Written Opinion of the International Searching Authority, or the Declaration," mailed on Mar. 29, 2007 in corresponding Intl. App. No. PCT/US2006/035840, 6 pages.
ISA/EPO, "Notification of Transmittal of the International Search Report and the Written Opinion of the International Searching Authority, or the Declaration," mailed on May 25, 2007 in corresponding Int'l. App. No. PCT/US2006/035839, 9 pages.
ISA/EPO, "Written Opinion of the International Searching Authority," mailed on Feb. 8, 2007 in corresponding Intl. App. No. PCT/US2006/026241, 15 pages.
ISA/EPO, "Written Opinion of the International Searching Authority," mailed on Mar. 29, 2007 in corresponding Int'l. App. No. PCT/US2006/035840, 8 pages.
ISA/EPO, "Written Opinion of the International Searching Authority," mailed on Sep. 13, 2006 in corresponding Int'l. App. No. PCT/US2006/035839, 12 pages.
Johnson, D., "Bus Emulation Drives Production Testing," Test & Measurement World Feb. 1995 vol. 15, No. 2 pp. 41-42, 44, 46, 48 ISSN: 0744-1657.
Lee, et al., "Modified Token-Update Scheme for Site Authentication, School of Computer Science and Engineering," Inha University, Incheon, 402-751, Korea, 6 pages.
Nystrom RSA Security M: "The Protected One-Time Password Protocol (EAP-POTP)," IETF Standard- Working-Draft, Internet Engineering Task Force, IETF, CH No. 2, Jun. 30, 2005, XP015040287.
O.J. Horak, "Means and Measures for Data Security," Armed Forces Data Processing Agency, Stifgasse 2a, A-1070 Wien, Austria, IFAC SAFECOMP '89, Vienna, Austria, 1989, 9 pages.
Open Specifications Integrate One-Time Passwords with Enterprise Applications, RSA Security, Feb., 2005, 10 pages.
Orlowski, Andrew, "Everything You Ever Wanted to Know About CPRM, But ZDNet Wouldn't Tell You . . . ," The Register.co.UK, Jan. 10, 2001, 6 pages.
Pinkas, Benny, "Efficient State Updates for Key Management," STAR Lab, Intertrust Technologies, Princeton, NJ, DRM 2001, LNCS 2320 pp. 40-56, 2002.
Renesas, X-Mobile Card, Digital Rights Management, Authentication and Secure Storage for Mobile Devices, Providing Remote Access and Secure Storage Solutions for IT, Advanced Solutions Group, 2005, 4 pages.
RSA Security Inc.: "A CryptoAPI Profile for One-Time Password Tokens V1.0 Draft 2" One-Time Password Specifications (OTPS), Jun. 27, 2005, XP002416270.
RSA Security Inc.: "OTP-WSS-Token: Web Services Security One-Time-Password (OTP) Token Profile, Version 1-0d3", One-Time Password Specifications (OTPS), Jul. 6, 2005, XP002416269.
RSA Security Inc.: "PKCS#11 Mechanisms for One-Time Password Tokens V1.0 5th Draft", One-Time Password Specifications, Jun. 27, 2005, XP002415773.
RSA Security, "Federated Identity Management and Return on Investment," White Paper, 2004-2005, 12 pages.
RSA Security, "Federated Identity Manager, A Technical Overview," Technology Backgrounder, 2005, 16 pages.
RSA Specification, "Cryptographic Token Key Initialization Protocol, V1.0 Draft 3," RSA Security, Jun. 14, 2005, 29 pages.
Rubin, "Independent One-Time Passwords," USENIX Association, Proceedings of the Fifth USENIX UNIX Security Symposium, Jun. 5-7, 1995, 13 pages.
Rubin, "Independent One-Time Passwords," USENIX, A Quarterly dedicated to the analysis and understanding of advanced computing systems, vol. 9, No. 1, Winter 1996, 15 pages.
SafeNet AXIS, "Strong Authentication and Single Sign-On," AXIS Instant Logical & Physical Access Security, 2005, 2 pages.
Secure Business-to-Business Single Sign-On (B2B SSO) Based on Federated Identity Management, RSA Security, 2004-2005, 6 pages.
Seitz, et al., "Key Management for Encrypted Data Storage in Distributed Systems," Proceedings of the Second IEEE International Security in Storage Workshop (SISW'03), 11 pages.
ST Microelectronics: "Trusted Platform Module (TPM)"; May 2004; XP-002345888; 5 pages.
Tsuchida, S., "Test and Repair of Non-Volatile Commodity and Embedded Memories," Proceedings International Test Conference 2002 (Cat. No. 02CH37382) p. 1223 ISBN: 0 7803 7542 4.
U.S. Appl. No. 11/317,862, "Secure Memory Card with Life Cycle Phases", filed Dec. 22, 2005, Holtzman et al.
VeriSign, "Extending Managed PKI Services to Smart Cards for Greater Convenience and Security," 2001, 14 pages.
VeriSign, "Trusted Federated Identity Solution Architecture," 2004, 16 pages.
Weippl, Edgar, "An Approach to Role-Based Access Control for Digital Content," Software Competence Center Hagenberg Hauptstr. 99 A4232 Hagenberg, Austria, 2001, 5 pages.
Wu, D.M., Doney, R., "A Universal Self-Test Design for Chip, Card and System," Proceedings 1992 IEEE International Workshop on Defect and Fault Tolerance in VLSI Systems (Cat. No. 92TH0481-2) pp. 305-314 ISBN: 0 8186 2837 5.
Yang, et al., "CD-Rom Versus Web-Access to External Databases-Experiences and Insights," Rider University Libraries, pp. 193-200.
Notice of Allowance issued in U.S. Appl. No. 11/317,390, dated Sep. 27, 2011 (9 pages).
Notice of Allowance issued in U.S. Appl. No. 11/317,862, dated Jul. 25, 2012 (7 pages).
Black, John, "Comments to NIST concerning AES Modes of Operations: A Suggestion for Handling Arbitrary-Length Messages with the CBC MAC," University of Nevada, Reno, Phillip Rogaway, University of California at Davis http://csrc.nist.gov/CryptoToolkit/modes/proposedmodes/xcbc-mac/xcbc-mac-spec.pdf, 2000 (3 pages).
Frankel, Sheila, "RFC 3566—The AES-XCBC-MAC-96 Algorithm and Its Use With IPsec," NIST-National Institute of Standards and Technology, 820 West Diamond Ave, Room 677, Gaitbersburg, MD 20899, http://www.faqs.org/rfcs/rfc3566.html, Sep. 2003 (10 pages).
Gemplus, Employee Smart Badge, One Integrated And Secure Smart Badge To Manage All Access, 2003 (2 pages).
Lee, et al., "Modified Token-Update Scheme for Site Authentication, School of Computer Science and Engineering," Inha University, Incheon, 402-751, Korea, 2005 (6 pages).
Seitz, et al., "Key Management for Encrypted Data Storage in Distributed Systems," Proceedings of the Second IEEE International Security in Storage Workshop (SISW'03), 2003 (11 pages).
Yang, et al., "CD-Rom Versus Web-Access to External Databases-Experiences and Insights," Rider University Libraries, pp. 193-200, 2000.

\* cited by examiner

| State | Key Generation | NVM Test | HW Test | FW Test | Crypto-Engine |
|---|---|---|---|---|---|
| 110 | Regenerated every power up | E | E | E | D |
| 120 | Constant and hard wired | D | E | E | E |
| 130 | Generated once | D | E | E | E |
| 150 | - | D | D | D | E |
| 160 | Regenerated every power up | D | E | E | E |
| 170 | - | D | E | E | D |

SECURE MEMORY CARD WITH LIFE CYCLE PHASES

CROSS REFERENCE TO RELATED APPLICATIONS

This application is related to the following applications, each of which is hereby incorporated by this reference in its entirety: "Memory System With In Stream Data Encryption/Decryption and Error Encryption" to Micky Holtzman et al., 60/638,485; "Memory System With In Stream Data Encryption/Decryption" to Micky Holtzman et al., 60/639,442; and "Hardware Integrity Check of Controller Firmware" to Micky Holtzman et al., 60/717,347.

FIELD OF THE INVENTION

The invention generally relates to memory cards and encryption, and in particular relates to eliminating the access to secure data and keys through the testing mechanisms in the card.

BACKGROUND OF THE INVENTION

Quite some time ago an intelligent memory card commonly referred to as the Smart Card was developed and gained acceptance in the marketplace as a form of identification and payment. The Smart Card contains a small amount of memory for storing a user's identification data and for storing transactional related data. The Smart Card is also often referred to as a chip card and is employed in Japan for various things such as the national identity card and in various places as a type of credit or debit card. In order to prevent identity theft and other monetary fraud, various chip designs and encryption schemes have been employed in the cards and the systems that utilize the cards.

In designing and manufacturing any type of secure memory card, there are two competing interests. One interest is maximizing the security of the card, while the other interest is maximizing the reliability of the card. In order to maximize the reliability of the card, it is important to be able to test the software and the hardware of the card at various manufacturing stages before it ships from the factory, and on some occasions even after it has left the factory in order to perform failure analysis. Testing may involve input and output of signals through test or contact pads on the chip to test both the hardware and software of the card. These test routines and test pads are necessary to ensure quality control but are a potential weak spot or "back door" to the secure data, algorithms, and keys of the card. Thus, there always exists some degree of compromise between (the testing necessary for) maximizing reliability and maximizing security. Different approaches have been put forth to close this "back door" after testing is complete. However, for various reasons prior solutions to date each have commercial and technical shortcomings.

In one approach, which is believed to be that employed in creation of the aforementioned Smart Card, die of the card is tested before singulation of the memory die from the wafer. The test pads for a particular die are located on an adjacent die of the wafer, and the singulation process severs the test pads from all circuitry of the adjacent die after testing. Therefore, any test pads present on a singulated die are completely isolated and closed as a potential back door to the secure data of the final memory card. However, it is not always practical or desirable to completely remove the test pads. For example, the lack of usable test pads precludes some amount of subsequent hardware based testing of the memory, which, for example, limits the potential methods of failure analysis.

While this approach may be preferred for a Smart Card, which typically only has a small amount of memory necessary to hold identification and transactional data, it is insufficient to test the comparatively massive amount of memory and complex security routines employed in a mass storage memory card used for storing multiple large files such as photos and music. Some examples of these mass storage memory cards are the Compact Flash card, MMC card, and SD card. The spread of digital content and the associated copyright issues elevate the importance of security, while at the same time the testing and reliability of the card remain paramount. A more comprehensive and flexible system for manufacturing, testing and operating secure mass storage memory cards is needed and is provided by the present invention which will be described below.

Another important aspect is cost. Several different technologies, such as non-volatile memory, logic, and volatile memory, can be fabricated on a single integrated circuit die (chip). However, mixing different technologies in one die significantly increases the cost of production. In a competitive environment where cost is a major driving force, it is highly desirable to limit the amount of different of technologies provided on one die. However, using multiple die may mean that sensitive information has to pass from one die to another in the final product. This is another potential weakness a hacker can exploit if appropriate precautions are not employed.

In particular, non volatile memory bits are expensive to mix with logic within the same die. The Smart Card employs non-volatile memory for data storage purposes in the same die as the logic that runs the Smart Card, which is a way of maximizing security. However, nowadays a memory card that benefits from the present invention must store very large music, photo, movie and other user files. Thus, it is cost prohibitive to manufacture a single integrated circuit die memory card that can store massive amounts of information (on the order of several gigabytes in 2005 and increasing), and it is necessary to develop a secure system employing multiple die. In particular, it is highly desirable to create a secure system (employing encryption and decryption) utilizing one or more discrete (cost effective) flash memory die that are separate from the controller die and that can be thoroughly tested before and after assembly, yet is invulnerable to attacks via the test mechanisms.

SUMMARY OF INVENTION

Because it is overly costly and presents problems in scalability to utilize a single chip that has both the controller functionality and the massive amounts of storage required by today's digital devices, an alternative system has been developed. With a single chip solution security can be achieved with unique chip design that makes it difficult to access testing mechanisms, encryption keys, and encrypted content. However, with a multiple chip design where content passes from a separate memory chip to a controller chip where encryption occurs, special attention must be paid to guarding access to encryption keys and to encrypted content. Furthermore, in a system that (preferably) still has test pads in the final assembly to allow for testing of the assembled system, special attention must be paid to any mechanisms in software and hardware that may serve as a back door for unauthorized access to the encrypted keys and content.

The present invention has numerous life cycle phases that are entered and passed through during the life of the card.

Depending on the phase, logic in the card enables or disables the encryption engine, controls access to hardware (before and after wafer singulation and card assembly) and software testing mechanisms, and controls key generation. These phases not only allow both the hardware and software of the card to be thoroughly tested before and after manufacture (unlike in the Smart Card where the test pads are removed), but also make it virtually impossible to access the encrypted keys and thus the encrypted content when the card is in a secure phase, the operating phase that the card is in when it is shipped to the user. Therefore, the present invention provides for a memory card that can be well tested but is also resistant to unauthorized access to protected data within the card.

Furthermore, a more comprehensive and flexible system for manufacturing, testing and operating secure mass storage memory cards is needed and is provided by the present invention which will be described below.

Additional aspects, advantages and features of the present invention are included in the following description of exemplary examples thereof, which description should be taken in conjunction with the accompanying figures, wherein like numerals are used to describe the same feature throughout the figures. All patents, patent applications, articles and other publications referenced herein are hereby incorporated herein by this reference in their entirety for all purposes.

DETAILED DESCRIPTION OF THE PREFERRED EMBODIMENTS

Memory System Architecture

Figure 1A:
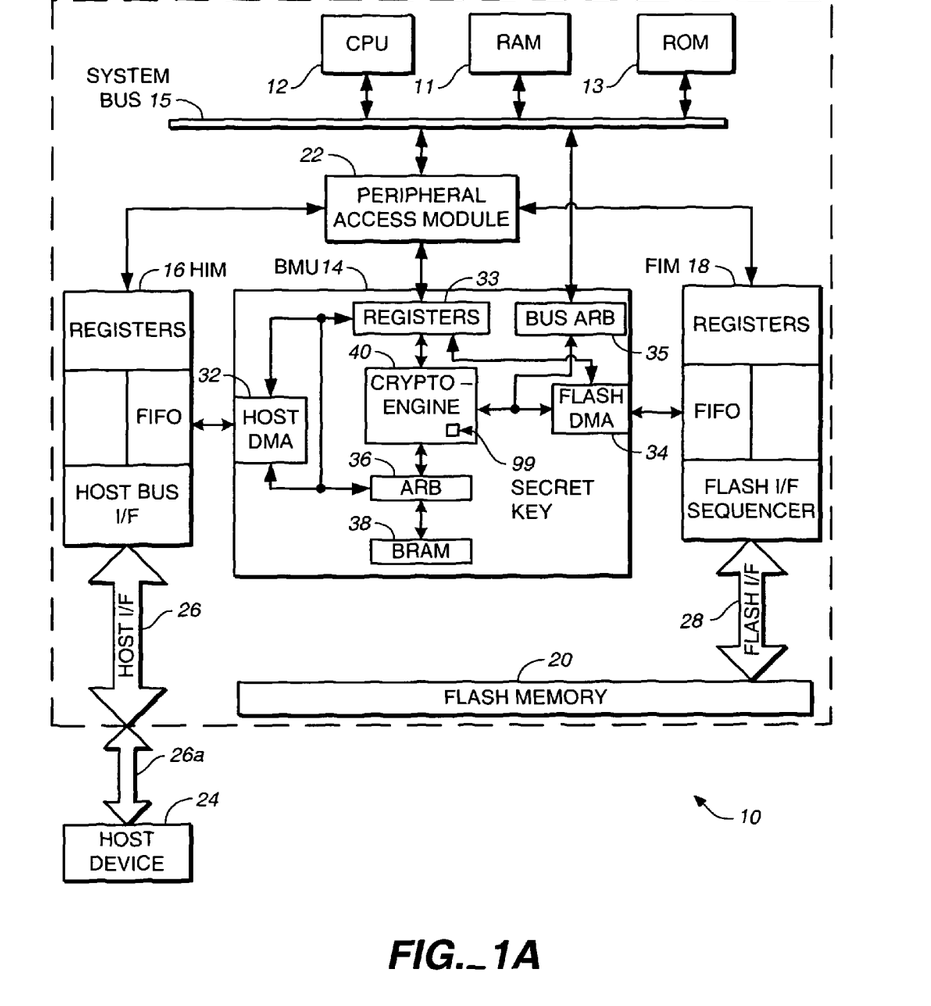
FIG. 1A is a schematic diagram of system 10 according to an embodiment of the present invention.

An example memory system in which the various aspects of the present invention may be implemented is illustrated by the block diagram of FIG. 1A. As shown in FIG. 1A, the memory system 10 includes a central processing unit (CPU) or controller 12, a buffer management unit (BMU) 14, a host interface module (HIM) 16, flash interface module (FIM) 18, a flash memory 20 and a peripheral access module 22. Memory system 10 communicates with a host device 24 through a host interface bus 26 and port 26a. The flash memory 20, which may be of the NAND type, provides data storage for the host device 24. The software code for CPU 12 may also be stored in flash memory 20. FIM 18 connects to the flash memory 20 through a flash interface bus 28 and in some instances a port, which is not shown, if the flash memory 20 is a removable component. HIM 16 is suitable for connection to a host system like a digital camera, personal computer, personal digital assistant (PDA) and MP-3 players, cellular telephone or other digital devices. The peripheral access module 22 selects the appropriate controller module such as FIM, HIM, and BMU for communication with the CPU 12. In one embodiment, all of the components of system 10 within the dotted line box may be enclosed in a single unit such as in memory card and preferably enclosed in the card.

The buffer management unit 14 comprises a host direct memory access unit (HDMA) 32, a flash direct memory access unit (FDMA) 34, an arbiter 36, a CPU bus arbiter 35, registers 33, buffer random access memory (BRAM) 38, and a crypto-engine 40 also referred to as encryption engine 40. The arbiter 36 is a shared bus arbiter so that only one master or initiator (which can be HDMA 32, FDMA 34 or CPU 12) can be active at any time and the slave or target is BRAM 38. The arbiter is responsible for channeling the appropriate initiator request to BRAM 38. HDMA 32 and FDMA 34 are responsible for data transported between HIM 16, FIM 18 and BRAM 38 or the RAM 11. The CPU bus arbiter 35 allows for direct data transfer from crypto-engine 40 and flash DMA 34 to RAM 11 via system bus 15, which is used in certain situations such as for example when it is desired to bypass the crypto-engine. The operation of the HDMA 32 and of the FDMA 34 are conventional and need not be described in detail herein. The BRAM 38 is used to store data passed between the host device 24 and flash memory 20. The HDMA 32 and FDMA 34 are responsible for transferring the data between HIM 16/FIM 18 and BRAM 38 or the CPU RAM 12a and for indicating sector completion.

When data from flash memory 20 is read by the host device 24, encrypted data in memory 20 is fetched through bus 28, FIM 18, FDMA 34, and crypto-engine 40 where the encrypted data is decrypted and stored in BRAM 38. The decrypted data is then sent from BRAM 38, through. HDMA 32, HIM 16, bus 26 to the host device 24. The data fetched from BRAM 38 may again be encrypted by means of crypto-engine 40 before it is passed to HDMA 32 so that the data sent to the host device 24 is again encrypted but by means of a different key and/or algorithm compared to those whereby the data stored in memory 20 is encrypted. Alternatively, rather than storing decrypted data in BRAM 38 in the above-described process, which data may become vulnerable to unauthorized access, the data from memory 20 may be decrypted and encrypted again by crypto-engine 40 before it is sent to BRAM 38. The encrypted data in BRAM 38 is then sent to host device 24 as before. This illustrates the data stream during a reading process.

When data is written by host device 24 to memory 20, the direction of the data stream is reversed. For example if unencrypted data is sent by host device, through bus 26, HIM 16, HDMA 32 to crypto-engine 40, such data may be encrypted by engine 40 before it is stored in BRAM 38. Alternatively, unencrypted data may be stored in BRAM 38. The data is then encrypted before it is sent to FDMA 34 on its way to memory 20.

Life Cycle Phases

A security system or secure operating system that is particularly useful when implemented in a memory card, such as the one described above, for example, has different phases or states. These phases are preferably entered sequentially, such that after progressing from one phase to the next, the previous phase cannot be re-entered. Therefore, they can be thought of as life cycle phases.

Figure 1B:
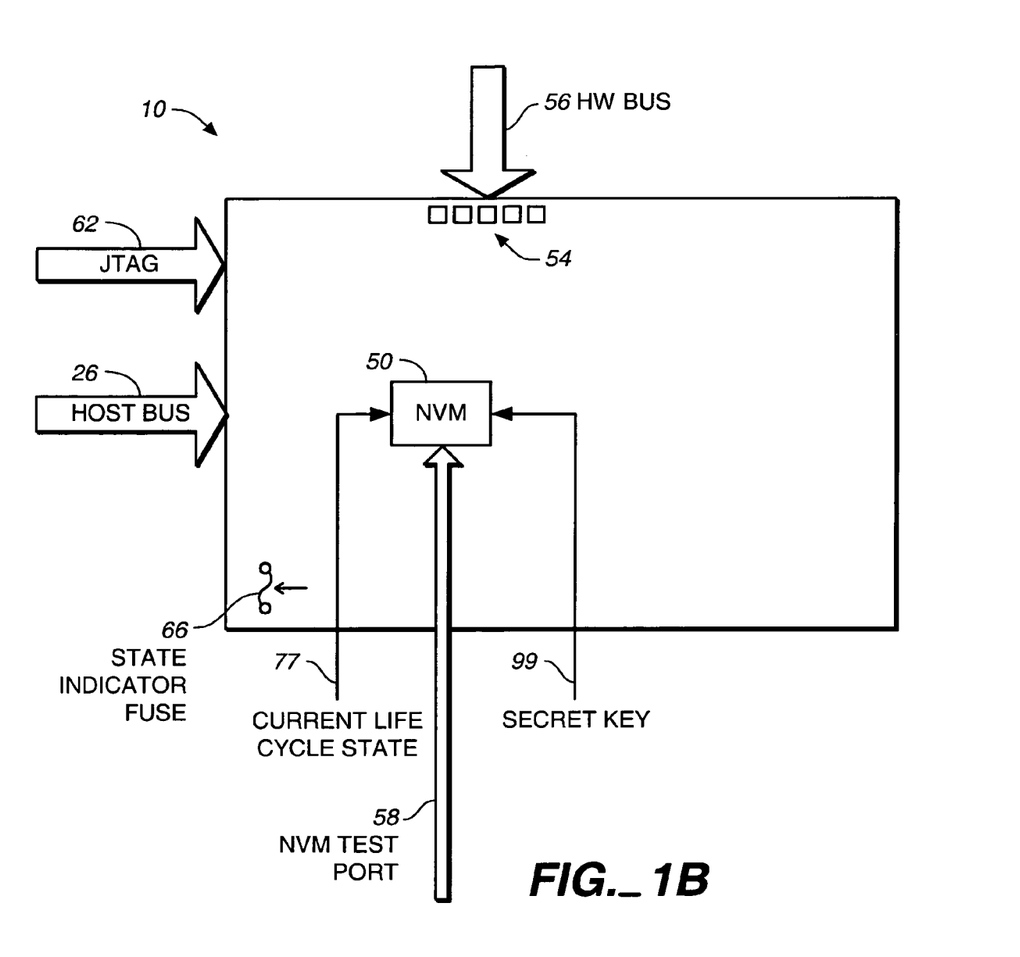
FIG. 1B is a schematic diagram of another embodiment of system 10.

Before describing the phases in detail, another system level diagram will be briefly discussed. FIG. 1B illustrates another embodiment of system 10. Only certain of the components of system 10 are illustrated in this figure for simplicity and clarity. Memory system 10 comprises test pads also referred to as hardware test input/output (I/O) 54. Hardware bus (HW bus) 56 is preferably connected to test pads 54. These test pads and HW bus 56 are connected to various hardware and circuitry (not shown) of system 10 and are used to test the hardware and circuitry of system 10. JTAG bus 62 is connected the system bus 15. (seen in FIG. 1A) and can be used to replace the controller firmware and drive hardware blocks from outside system 10. It is used for hardware testing that requires register read/write operations. Since JTAG bus 62 can access the RAM and ROM it is also used to test the firmware of system 10. Host bus 26 is utilized to send diagnostic commands to system 10 and is used to test the firmware of the system.

NVM 50 of encryption engine 40 is also shown. Stored within NVM 50 are (values for) life cycle state 77 and secret key 99. NVM test port 58 is used to test the NVM within encryption engine 40.

The state indicator fuse 66 is used to indicate that the product is in NVM state 110 (described below) rather than relying on the NVM content. The reason is that the reliability of an initial value stored in NVM during fabrication cannot be guaranteed. Therefore another more reliable indicator such as a fuse is used. The system will determine that it is in state 110 if the fuse is set. If the system 10 is reset it will look at the NVM life cycle state 77 to determine the state.

Figure 2A:
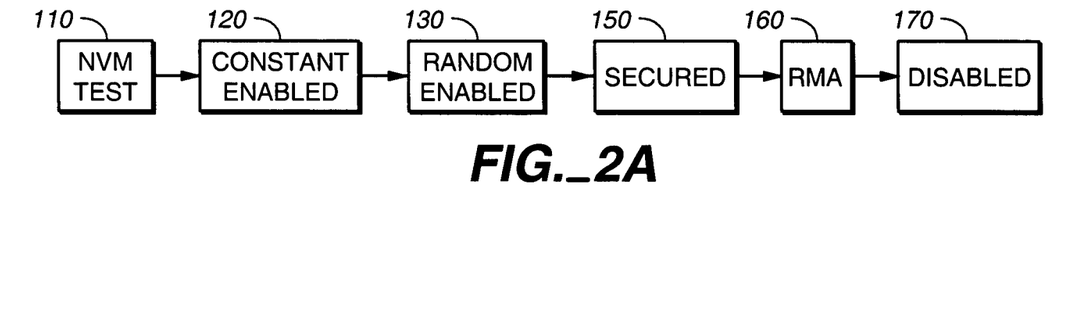
FIG. 2A is a flowchart illustrating the various life cycle phases in an embodiment of the present invention.

FIG. 2A illustrates the various states and the order of transition between the states. Each state defines different behavior and capabilities of the card (or other system in which it is implemented), before and after the card is manufactured, as can be seen in the following table, which is also reproduced as FIG. 2B.

Figure 2B:
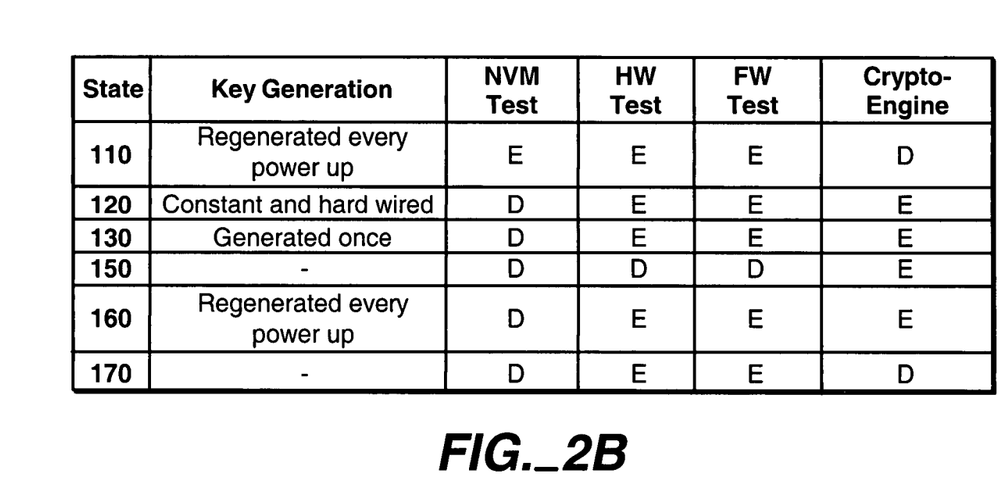
FIG. 2B is a chart of the various life cycle phases.

| State | Key Generation | NVM Test | HW Test | FW Test | Crypto-engine |
|---|---|---|---|---|---|
| 110 | Regenerated every power up | E | E | E | D |
| 120 | Constant and hard wired | D | E | E | E |
| 130 | Generated once | D | E | E | E |
| 150 | — | D | D | D | E |
| 160 | Regenerated every power up | D | E | E | E |
| 170 | — | D | E | E | D |

The state is preferably stored as a 32 bit value within the non volatile memory of the encryption engine. There are 5 pre-assigned values out of a huge number of possible ($\approx 10^9$) combinations that are used to represent states 120, 130, 150, 160, and 170. All other values are indicative of state 110. This is so because it cannot be guaranteed that a defined value can be reliably stored during fabrication and retrieved thereafter because various processing operations during fabrication, assembly, testing, and shipping may alter any stored value in memory.

The key value is also preferably stored as a 128 bit field in the non volatile memory of the encryption engine. The key value is normally generated randomly by a seeded algorithm. Regeneration of the key is highly likely to change the value of the key, but this cannot be guaranteed because a (pseudo) random number generator may in fact generate the same value successively. However, the terminology of changing the key is used interchangeably with that of regenerating the key in this application even though it is well understood the value of the key may not change during regeneration. Needless to say, the value of the key used to encrypt information is critical. The same key value must be used for both encryption and decryption. Thus, if a key value is regenerated at every power up of the system, data that was encrypted before that power up is virtually worthless because it cannot be decrypted with the new key. Although the data is still physically present in the memory of the card, the data is useless without the proper key value to unlock it. Thus, if a hacker manages to somehow force the card back into a state, other than secure state 150, he will not be able to get any worthwhile information. In states 110 and 160, a new key will be generated at every power up and the key used to previously store information in state 150 will not be available to decrypt that information. In states 170 and 110 the encryption engine is simply not available, regardless of the key value.

Another security measure comprises limiting the availability of firmware and hardware test mechanisms. The system comprises logic that will either enable or disable the mechanisms. The previously described host bus is one of the mechanisms used to test the firmware of the card. The host can issue diagnostic commands over the host bus to test the firmware. The hardware may also be tested when these commands are executed. The hardware is also directly tested over the hardware bus as well as the JTAG port, which provides direct access to various memories of the system. Note that in state 150 the NVM test mechanisms, HW test mechanisms, and FW test mechanisms are all disabled.

The states and the passage between the states as seen in FIG. 2A will now be described in further detail.

State 110 is referred to as the controller non-volatile memory (NVM) test. This state is the initial state after fabrication of the memory die, and is the state that is used to test non volatile memory of the controller die before the die is packaged and installed into the memory card. The testing that occurs in this state may be performed before singulation while the dice are still integral in wafer format, or may alternatively be performed on the individual die after singulation. Once the NVM is tested, its content (using the NVM tester) is initialized to indicate state 120, and fuse 66 is blown. In this state the encryption engine 40 is disabled. This state is only designed to be entered into once in the life cycle of the card and there is no method within the system for returning to this state. However, as discussed previously, this state is indicated by anything other than the 5 pre-assigned values of the many possible combinations of the 32 bit value used to define the life cycle state. Therefore, each time the card is powered up and is in this state, a new key will be randomly generated, and the previously encrypted data impossible to decrypt. If an illegal value is detected and the fuse is blown (not allowing NVM state 110 to be entered) the crypto-engine will never become ready and the system will not boot, i.e. it will not go beyond step 302 described below with regard to FIG. 3. Even though the encryption engine is not enabled in this mode, because the mode is designed to be used to test the controller NVM during fabrication, the key is still regenerated at every power up to protect against a hacker who may in some unforeseen way enter this state and try to probe the secure data of the card via the various test ports and mechanisms. Otherwise, by design, after exiting state 110, the NVM testing mechanisms are no longer available.

State 120 is referred to as the constant enabled state. This state is used for controller and memory testing during assembly. In this state the encryption engine 40 is enabled. The key that the encryption engine will use is not generated by the random number generator, and is not stored in memory, but is hard wired to some external source and constant during this phase. The hardware and software testing mechanisms are available in this state. This state is entered by a hardware tester.

State 130 is referred to as the random enabled state. This state is similar to state 120, however, the secret key is randomly generated (once) when state 130 is entered instead of being constant and hard wired. This is the state used for final testing, characterization, and qualification of the memory card. Cryptographic operations including encryption and decryption are possible with the firmware using a secret key or a key derived from the secret key. This state is entered by code that is loaded into system 10 by host device 24 and then executed by system 10.

State 150 is referred to as the secured state. This is the state in which the card is shipped from the factory. The hardware and software test mechanisms are disabled by the card logic and cannot be accessed. This state is entered at the end of testing and configuration of the product on the manufacturing floor. The key is not regenerated and the value that was stored in memory during the previous state is utilized during state 150. While derivative keys may be utilized for various operations of the card, the key 99 will always be necessary to derive those keys and to encrypt and decrypt data. This key is meant to be utilized for the life of the secure card (while in the hands of the consumer as a secure card, not after). The firmware in the card cannot use the secret key for any operation. It is the hardware of the encryption engine that is responsible for performing all encryption and decryption within the card. This state is entered by DLE code.

State 160 is referred to as the returned merchandise authorization or RMA state. This state is designed to allow testing of a card that has been returned by a consumer because it is not working properly. This is the state in which failure analysis of the card can be performed. The software and hardware test mechanisms are again available. It is important to note that this state is only accessible by the factory. Furthermore, after the RMA state is entered, the card can never again be used as a secure card. In other words, it can never again enter state 150 or otherwise be used to decrypt information resident on the card or to save encrypted information to the card. The secret key is regenerated when this mode is entered and during every chip reset performed while the card is in this state. Operation using the secret key for decryption is enabled only at boot time and the firmware cannot use the secret key for any operations. This state is entered by a ROM code that is the result of a host command.

State 170 is referred to as the disabled state. In the disabled state, the crypto-engine 40 is in bypass mode with all of the cryptographic abilities disabled. Only non-secure algorithms are used within the card. Hardware and software test mechanisms are again enabled because without the encryption engine there is nothing worthy of being hacked or otherwise tampered with. Any encrypted information can no longer be decrypted and is rendered worthless. Also, no additional information may be encrypted and subsequently decrypted. This state may be used to produce a non-secure or "regular" card. In this way, the same system can be used to produce both secure and non-secure memory cards. The difference is that in the non-secure card the security system of the card is in the disabled state, or the card can more generally be said to be in state 170. The disabled state can also be used to re-ship a product that has been sent back to the factory for failure analysis, and has therefore been passed into RMA state 160. As mentioned above, after a card enters into RMA state 160, it can never return to any of the previous states, and may never be sold again as a secure card. However, a card that is functional or can be made functional again at the factory can be placed into disabled state 170 and re-sold as a non-secure card. In this way, the card can be salvaged and would for all intensive purposes be the same as a new non-secure or "regular" card. Both the salvaged non-secure card and a new non secure card will be running the same firmware in the same state.

Currently, the vast majority of cards are non-secure cards. While the drive to bring to market secure cards is high due mainly to the demands of content providers, it is unclear what percentage of future memory card sales will be for secure cards vs. non-secure cards. What is clear is that there should likely always be an abundance of non secure content and therefore a demand for non-secure cards. The present invention not only enables testing of all of the hardware and software of a secure card (by only authorized personnel), but also provides the ability to salvage returned secure cards for various non-secure uses. Moreover, the system of the present invention allows for a card that has robust security, but that need not be discarded or have its security system compromised (with accessible "back doors") in order to perform failure analysis. Given the widespread and increasing proliferation of devices that use memory cards, the ability to salvage what would otherwise be a defective secure card is a great benefit to the consumer and manufacturer alike.

Figure 3:
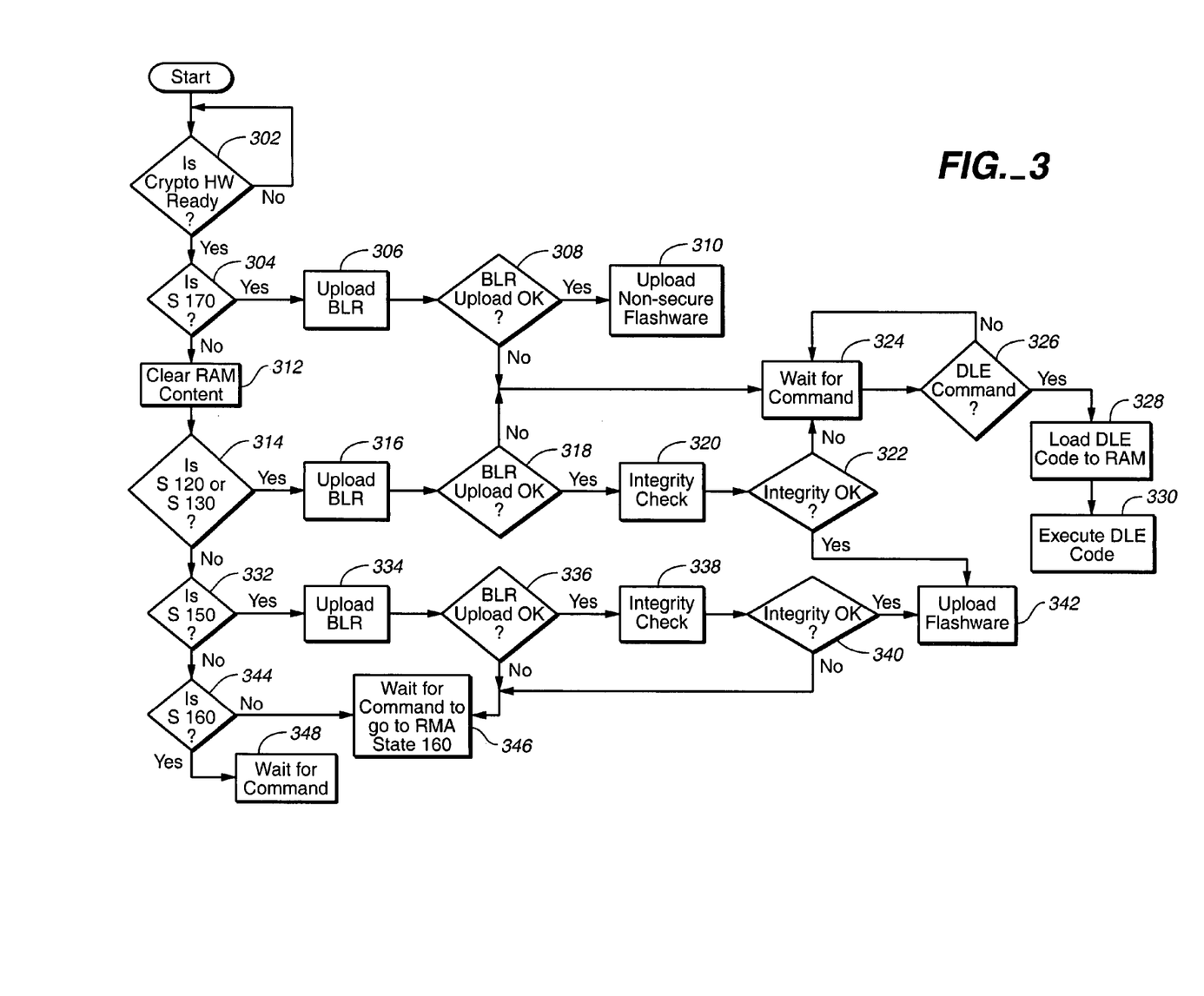
FIG. 3 is a flow chart illustrating the boot up process and life cycle phases.

FIG. 3 illustrates the booting process for a memory card implementing the system described above. For more information on the boot up process please refer to a co-pending application to M. Holtzman et al., 60/717,347, hereby incorporated by reference in its entirety.

In step 302, the system checks if the cryptographic hardware, including crypto-engine 40 and other components, is ready. The system will wait to proceed until the hardware is ready. When the hardware is ready the system advances to step 304. In step 304 the system checks to see if the card is in state 170, the disabled state. If the card is in state 170, in step 306 the system will upload the boot loader ("BLR") which is a minimal amount of startup code, from flash memory 20 to RAM 11. Next, in step 308 the system checks to see if the BLR was properly uploaded. If so, in step 310 the system will upload the firmware necessary to run in non-secure mode (the standard firmware minus the cryptographic functionality). If the BLR was not properly uploaded in as determined in step 308, the system will advance to step 324 described below.

If in step 304 the system determined that the card was not in state 170, the system will clear the RAM contents in step 312. After that the system will again check to see what state the card is in step 314. If the card is in state 120, or 130, the BLR will be uploaded in step 316. In step 318 the system will check to see if the BLR was properly uploaded. Next, in step 320 an integrity check of the BLR code will be performed. This integrity check is a hardware based check performed by calculating message authentication code (MAC) values and comparing them with reference values. The result of the integrity check is a simple flag stored in memory. In step 322 the firmware checks the flag to see if the integrity was verified or not. If the integrity is OK, the system will then in step 342 upload the firmware necessary to run in secure mode, which also of course allows for non secure data to be stored and retrieved. If the integrity is not OK as determined in step 322, the system will wait for a diagnostic command from the host to download and execute certain instructions from the host (DLE command), as is represented by step 324. If a DLE command is received, as seen in step 326, the system will proceed to load the DLE code into RAM in step 328. In step 330 the DLE code will be executed by the controller.

If in step 314 it was determined that the card was not in state 120, 130, or 140 the system will check in step 332 to see if the card is in state 150. If so, the system will then upload the BLR in step 334. This is done by the ROM code. If the BLR upload was OK, as determined in step 336, a hardware based integrity check, as described above in step 320, will be performed in step 338. After this hardware based integrity check, another integrity check, this time a software based integrity check will be performed in step 340. If the integrity is OK, the system will then in step 342 upload the firmware necessary to run in secure mode, which also of course allows for non secure data to be stored and retrieved.

If in step 332 it was determined that the card was not in state 150, the system will then check the state of card and if the card is in state 160 and if so it will wait for a diagnostic command as represented by step 348. If, however, in step 344 it is determined that the card was not in state 160, the system will wait for a command to go into RMA state 160, as seen in step 346.

Although the various aspects of the present invention have been described with respect to exemplary embodiments thereof, it will be understood that the present invention is entitled to protection within the full scope of the appended claims.

It is claimed:

1. A memory card having a plurality of states which may be entered sequentially, wherein the memory card is operable either as a secure card in one state or as a non-secure card in a subsequent state, the memory card comprising:
   a non-volatile memory; and
   a controller coupled to the non-volatile memory and including a cryptographic function,
   wherein the controller is configured to transition the memory card between a testing state in which testing of the memory card is enabled, a secure operating state in which the cryptographic function is enabled and the memory card is operational for use as a secure card, and, after operating in the secure operating state, a bypass state in which the cryptographic function is disabled and the memory card is operational as a non-secure card, and wherein once in the bypass state the controller operates the memory card as a non-secure card wherein the memory card is unable to ever again transition to the secure operating state.

2. The memory card of claim 1, wherein the memory card is configured for deployment in the bypass state as the non-secure card.

3. The memory card of claim 1, wherein the memory card is configured for deployment in the secure operating state as the secure card.

4. The memory card of claim 3, wherein the memory card is initially configured for deployment as the secure card and is reconfigurable upon return to a manufacturer as the non-secure card via the bypass state of the controller.

5. The memory card of claim 1, wherein the memory card is configured to operate only one state at a time.

6. The memory card of claim 5, wherein the controller is further configured to transition to a failure analysis state from the secure operating state and to prevent the controller from re-entering the secure operating state.

7. A method of operating a memory card either as a secure card or as a non-secure card, comprising:
   in a memory card having a non-volatile memory, a controller coupled to the non-volatile memory and including a cryptographic function, the memory card:
      entering into a testing state in which testing of the memory card is enabled;
      entering into a secure operating state after the testing state wherein the cryptographic function is enabled and the memory card is operational as a secure card; and
      entering into a bypass state after the secure operating state, wherein the cryptographic function is disabled, the memory card is operational as a non-secure card and once in the bypass state the controller operates the memory card as a non-secure card wherein the memory card is unable to ever again transition to the secure operating state.

\* \* \* \* \*